(12) United States Patent
Lafont et al.

(10) Patent No.: US 8,448,897 B2
(45) Date of Patent: May 28, 2013

(54) REAR PART OF AN AIRCRAFT COMPRISING A STRUCTURE FOR SUPPORTING ENGINES, CONNECTED TO THE FUSELAGE BY AT LEAST ONE BLOCKING ELEMENT UNDER COMPRESSION LOADING

(75) Inventors: Laurent Lafont, Pechbusque (FR); Frederic Journade, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 177 days.

(21) Appl. No.: 13/063,080

(22) PCT Filed: Sep. 16, 2009

(86) PCT No.: PCT/FR2009/051741
§ 371 (c)(1), (2), (4) Date: May 19, 2011

(87) PCT Pub. No.: WO2010/031960
PCT Pub. Date: Mar. 25, 2010

(65) Prior Publication Data
US 2011/0226893 A1      Sep. 22, 2011

(30) Foreign Application Priority Data
Sep. 18, 2008   (FR) ..................................... 08 56300

(51) Int. Cl.
B64D 27/00         (2006.01)
(52) U.S. Cl.
USPC ........................................... 244/54; 248/554
(58) Field of Classification Search
USPC ............... 244/54, 55; 248/554, 555, 556, 557
See application file for complete search history.

(56) References Cited

U.S. PATENT DOCUMENTS

| 4,044,973 | A  | * | 8/1977  | Moorehead ..................... 244/54  |
| 4,500,054 | A  | * | 2/1985  | Osborn .......................... 244/54  |
| 4,821,980 | A  | * | 4/1989  | Clausen et al. ................. 244/54  |
| 5,065,959 | A  | * | 11/1991 | Bhatia et al. ................... 244/54 |
| 7,726,602 | B2 | * | 6/2010  | Llamas Sandin ............... 244/54  |
| 7,815,145 | B2 | * | 10/2010 | Beardsley ....................... 244/54 |
| 8,016,233 | B2 | * | 9/2011  | Moore et al. .................. 244/119 |
| 2011/0168836 | A1 | * | 7/2011 | Sanz Martinez et al. ....... 244/54 |

FOREIGN PATENT DOCUMENTS

| EP | 0 311 155 | 4/1989 |
| GB | 724 052 | 2/1955 |
| WO | 2007 144377 | 12/2007 |

OTHER PUBLICATIONS

U.S Appl. No. 13/257,628, filed Sep. 20, 2011, Lafont, et al.
International Search Report issued Feb. 4, 2010 in PCT/FR09/051741 filed Sep. 16, 2009.
U.S. Appl. No. 13/063,369, filed Mar. 10, 2011, Lafont.
U.S. Appl. No. 13/063,302, filed Mar. 10, 2011, Lafont, et al.

* cited by examiner

*Primary Examiner* — Christopher P Ellis
(74) *Attorney, Agent, or Firm* — Oblon, Spivak, McClelland, Maier & Neustadt, L.L.P.

(57) ABSTRACT

A rear part of an aircraft including a support structure for supporting engines, passing through the fuselage, through first and second openings. The rear part includes a connection structure connecting the support structure to the fuselage, including a first connection mechanism connecting the support structure to a first casing forming the first opening and a second connection mechanism connecting the support structure to a second casing forming the second opening. The first and second connection mechanisms each include at least one blocking element of the support structure, under compression loading by being applied to the casing and to the support structure.

10 Claims, 6 Drawing Sheets

REAR PART OF AN AIRCRAFT COMPRISING A STRUCTURE FOR SUPPORTING ENGINES, CONNECTED TO THE FUSELAGE BY AT LEAST ONE BLOCKING ELEMENT UNDER COMPRESSION LOADING

TECHNICAL FIELD

The present invention generally relates to a rear part of an aircraft, equipped with engines fastened on the fuselage thereof.

BACKGROUND OF THE INVENTION

To make such a rear aircraft part, it has been proposed, in the prior art, to insert an attachment mast between the fuselage and each engine. In that configuration, the mast is fixed directly on the fuselage. To ensure a satisfactory transfer of motive force towards the fuselage, significant dimensioning is necessary for the mast, the part of the fuselage supporting it, and the fastening means inserted between those elements. This amounts to drag, which penalizes the overall aerodynamic performance of the aircraft.

Another solution consists of providing a support structure for the engines going through the fuselage, as well as the inner space of the aircraft defined by said fuselage. At the level of its passage through the two fuselage openings, the through structure is spliced to the fuselage using a plurality of bolts or similar fastening members, forming all or part of the fastening means inserted between the opening casings and the support structure.

Nevertheless, the placement of these fastening means remains delicate, in particular due to the problems of accessibility for the operators performing such a task. Furthermore, they often have large masses and costs, in addition to usually being sensitive to fatigue stresses, which significantly reduces their lifespan.

BRIEF DESCRIPTION OF THE INVENTION

The invention therefore aims to propose a rear part of an aircraft at least partially resolving the aforementioned drawback, relative to the embodiments of the prior art.

To that end, the invention relates to a rear part of an aircraft comprising:
  a fuselage delimiting an inner area of the aircraft;
  at least two engines;
  a support structure for the engines, passing through said fuselage at first and second openings formed therein and distributed on either side of a vertical middle plane of the aircraft, said support structure having first and second opposite ends;
  each of said first and second opposite ends of the support structure protruding outwardly from the fuselage, on either side of said vertical middle plane, respectively, and supporting one of said engines; and
  fastening means connecting said support structure to the fuselage, comprising first fastening means connecting said structure to a first casing forming said first fuselage opening and second fastening means connecting said structure to a second casing forming said second fuselage opening.

According to the invention, said first fastening means comprise at least one blocking element of said support structure, under compression loading while bearing on one hand on said first casing, and on the other hand on said support structure, and said second fastening means comprise at least one locking element of said support structure, under compression loading while bearing on one hand on said second casing, and the other hand on said support structure.

Thus, the invention proposes an original design in which the first and second fastening means are at least partially formed using blocking elements that work in compression, and no longer in traction as was the case for the traditional elements of the prior art, of the bolt type or a similar type. Moreover, it is preferably done such that the first and second fastening means, which alone ensure the connection of the structure in the first casing and the second casing, respectively, are completely lacking such bolts and any other similar fixing means working in traction.

The result is advantageously an easy placement of these blocking elements, as they can be located entirely in the fuselage openings, without having to pass through the casings or the support structure of the engines. Moreover, these blocking elements can have reduced masses and costs, and above all remain only slightly or not at all sensitive to fatigue stresses, giving them an increased lifespan relative to that of the fastening means previously encountered.

Preferably, each of said first and second fastening means comprises at least two blocking elements of said support structure, under compression loading along two separate directions, respectively, for example substantially orthogonal to each other.

Generally, each blocking element under compression loading exerts a force on a given face of the structure, which leads the face opposite that given face to bear on the face of the casing opposite it. Thus, for each opening, when blocking elements under compression loading along two separate directions are provided, respectively, in the middle opening plane, this is sufficient to maintain the structure relative to the opening casing, in all directions of that middle plane of the fuselage opening.

It should be noted that the bearing between the casing and said opposite face of the support structure can be with or without direct contact, damping means for example being able to be inserted between those two elements, as will be specified below.

Indeed, preferably, each blocking member bears on said support structure and/or on its associated casing, via a damping member. This advantageously makes it possible to procure a certain flexibility for the first and second fastening means, reducing the vibrations in the fuselage. In other words, the damping members, preferably made from an elastically deformable polymer material, for example of the elastomer or rubber type, advantageously make it possible to damp the vibrations, and therefore participate in insulating, from a vibration perspective, the fuselage from the engine. Moreover, the low level of force encountered, as well as the low surrounding temperature due to the distance from the engine, constitute two criteria favorable to the placement of such damping members. Lastly, the presence of these damping members makes it possible to eliminate, during assembly operations, the potential tolerance problems inherent to the hyperstaticity of the assembly, when such hyperstaticity is provided.

Alternatively, other damping members of the spring type can be used.

Preferably, each blocking element has means for adjusting the spacing between its two bearing surfaces respectively bearing on the support structure and on the concerned casing. This functionality makes it possible not only to facilitate the placement of these blocking elements in the opening, but also to apply a compression pre-stress to them with a desired value.

Preferably, each blocking element assumes the form of a compression rod supporting two opposite bearing surfaces.

Preferably, each of said first and second fastening means comprises blocking elements bearing on at least two faces of said support structure, as well as at least one secondary damping member inserted between another face of said support structure, and said concerned secondary casing. Preferably, each secondary damping member is of a nature identical or similar to that of the damping members described above, intended to equip the blocking elements.

Still more preferably, said support structure and said first and second casings each have four faces substantially forming a quadrilateral in section along the associated middle opening plane, each of said first and second fastening means comprises blocking elements bearing on two attached faces of said support structure, as well as secondary damping members inserted between the other two attached faces of said support structure, and said concerned casing.

The secondary damping members make it so there is no direct contact between the support structure and the casings, even if such direct contacts could be contemplated, without going beyond the scope of the invention. When such damping members and secondary damping members are not provided, a so-called rigid assembly is then obtained between the support structure and the casings.

Moreover, in the preferred contrary case where damping members and secondary damping members are provided, it is preferably done such that some or each of these members can compress only over a limited crushing travel, beyond which a rigid contact between the structure and the casing prohibits the continuation of the crushing.

Still preferably, said fastening means also comprise at least one effort recovery connecting rod whereof a first end is mounted on said support structure, and the opposite end of which is mounted on the fuselage, spaced away from the first and second openings.

Thus, this advantageously makes it possible to minimize the intensity of the forces passing through the fuselage opening casings, allowing the latter to have smaller dimensions than those previously seen. Indeed, part of the forces coming from the engine and oriented towards the fuselage no longer uses the opening casings of the fuselage, but passes through the connecting rods specific to the present invention, the first aim of which is therefore to introduce motive forces at points of the fuselage spaced away from the openings. The concentration of stresses within the opening casings of the fuselage is therefore substantially minimized.

Moreover, to minimize the concentration of stresses within the support structure of the engines, at the fuselage openings, it is preferably done so that the first connecting rod end is also mounted on that support structure, away from the openings. The structure less locally stressed can thus have smaller dimensions, for non-negligible mass savings.

Preferably, said effort recovery connecting rod is inclined relative to a vertical direction of the aircraft, seen along a longitudinal direction thereof. This allows it to transfer forces in a direction whereof at least one component is oriented in the transverse direction of the aircraft. These transverse forces are in fact the most difficult to recover with the first and second fastening means housed in the fuselage openings, so that the aforementioned orientation of said connecting rod responds to a real issue.

Preferably, said support structure is made from first and second half-structures respectively passing through said first and second openings of the fuselage, said first and second half-structures being assembled to each other so that they can be disassembled within said inner area.

Thus, this makes it possible to greatly facilitate the assembly and disassembly operations of the support structure of the engines, since it is currently done from two separate half-structures, assembled to each other reversibly. Each of these two half-structures can thus be manipulated independently of the other during an assembly/disassembly, making the work easier for operators. In particular, each support half-structure only requires going through a single fuselage opening, advantageously involving a noticeable simplification for the operators, both during the initial assembly and during replacement of the support structure.

Moreover, during an assembly operation, each half-structure can be equipped, at its end, with its engine, before being inserted into its corresponding fuselage opening, to then be assembled to the other half-structure. This still further simplifies the assembly method relative to that previously used with the single structure solution, since with the latter, the assembly of the engines on that structure was possible only after placing that structure on the fuselage.

Naturally, this last advantage is also observed during an operation to disassemble the support structure from the engines, given that each engine can be placed while remaining attached to its associated support half-structure.

Lastly, another advantage resulting from the embodiment with two half-structures lies in the possibility of tilting them relative to each other, when they are seen from the front, in particular so that they form a V.

Nevertheless, a through support structure, made in a single piece and passing through the two openings of the fuselage, can be considered without going beyond the scope of the invention.

Other features and advantages of the invention will appear in the non-limiting detailed description below.

BRIEF DESCRIPTION OF THE DRAWINGS

This description will be done in light of the appended drawings, in which.

DETAILED DESCRIPTION OF THE INVENTION

Figure 1:
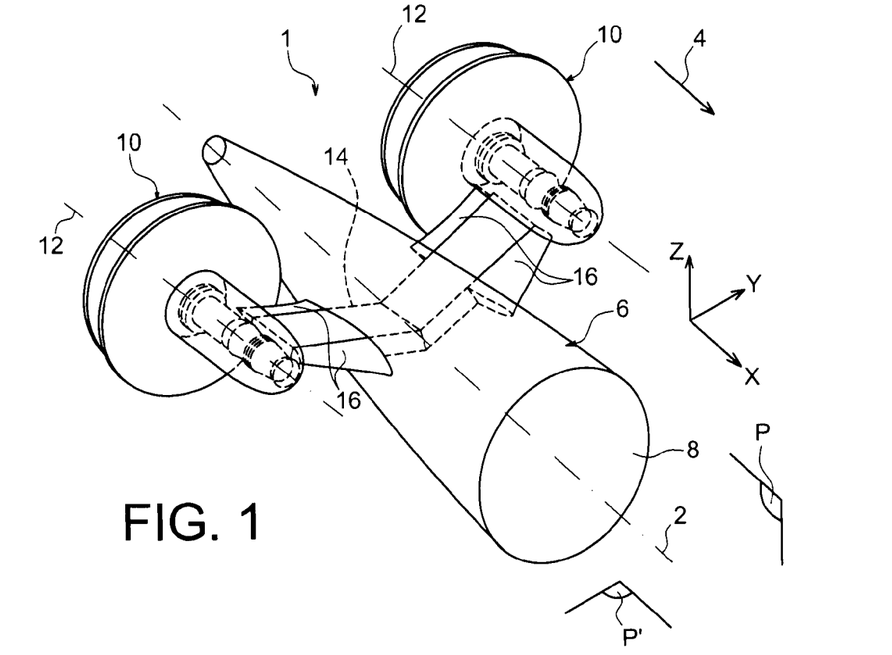
FIG. 1 shows a diagrammatic perspective view of a rear portion of the aircraft, according to one preferred embodiment of the present invention.

FIG. 1 shows a rear part 1 of an aircraft assuming the form of one preferred embodiment of the present invention.

In all of the following description, by convention, X refers to the longitudinal direction of the aircraft, which is parallel to a longitudinal axis 2 of that aircraft. Y refers to the direction oriented transversely relative to the aircraft, and Z refers to the vertical direction or the height, these three directions X, Y and Z being orthogonal to each other.

Moreover, the terms "front" and "rear" should be considered relative to a direction of forward motion of the aircraft encountered after the thrust exerted by the engines, this direction being shown diagrammatically by arrow 4.

Overall, the rear part 1 comprises a fuselage 6, with a substantially circular, elliptical or similar transverse section, with a center passing through the longitudinal axis 2, and delimiting an inner area of the aircraft 8.

Furthermore, it comprises at least two engines 10 arranged on either side of a vertical middle plane P passing through the axis 2. In the preferred embodiment, two engines 10 are provided, one on either side of the fuselage 6, these engines being able to indifferently be of the turbojet engine, turboprop, or other type. Each of these has a longitudinal axis 12 substantially parallel to direction X.

To ensure the suspension of these engines, a support structure 14 is provided, preferably arranged in a transverse plane, and which has the particularity of passing through the inner area 8 as well as the fuselage at two openings thereof. The portions of this structure 14 that are laterally spaced away from the plane P, and that protrude outwardly from the fuselage, are covered with aerodynamic fairings 16, as shown in FIG. 1.

Figure 2:
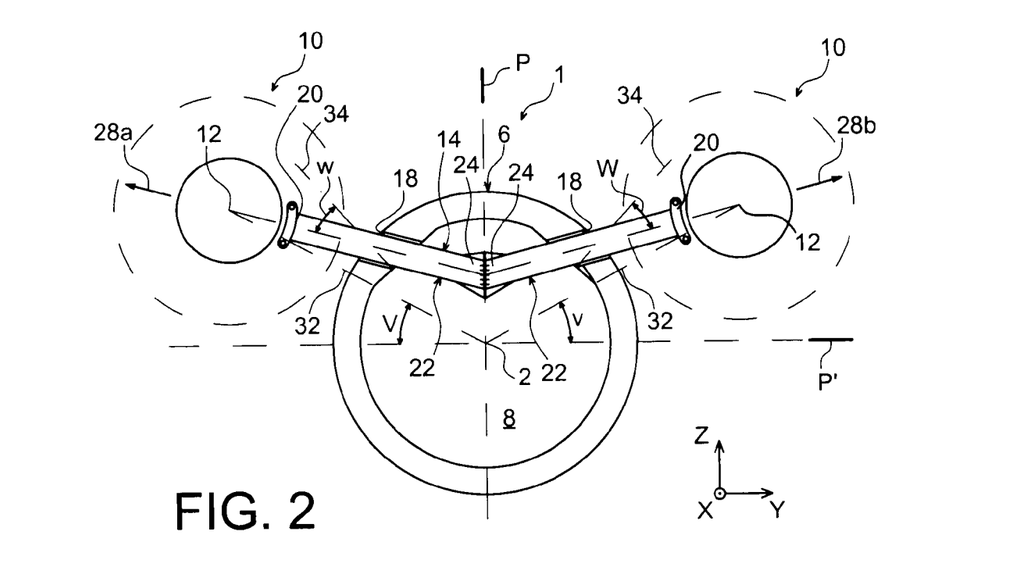
FIG. 2 shows a more detailed view in transverse cross-section of the rear part of the aircraft shown in FIG. 1, the means for fastening the support structure of the engines on the fuselage having intentionally been omitted.

More precisely, in reference to FIG. 2, one can see that the support structure 14 passes through the fuselage 6 at first and second openings formed therein, both referenced 18. These two openings are distributed on either side of the vertical middle plane P, and arranged symmetrically relative to the latter, which also substantially constitutes a plane of symmetry for the entire rear part of the aircraft.

The support structure 14 has first and second opposite ends, both referenced 20, each protruding outwardly from the fuselage, respectively on either side of the plane P, and supporting one of the engines 10.

Each end 20 can thus be likened to a rigid attachment mast 4 structure, for example with a design identical or similar to those known from the prior art to suspend an engine under a wing, and therefore ensuring the transfer of motive forces towards the structure of the aircraft.

In this preferred embodiment, the support structure 14 of the engines is made from first and second half-structures, both referenced 22, and respectively passing through the first and second openings of the fuselage 18, 18, respectively.

Moreover, they are assembled to each other so that they can be disassembled within the inner area 8. To that end, the first half-structure 22 has an inner end 24 opposite the first end 20, and the second half-structure 22 has another inner end 24 opposite the second end 20, the two inner ends 24, 24 therefore being in contact and assembled to each other so that they can be disassembled within the inner area 8, for example using bolts and/or shearing pins (not shown).

Preferably, the junction between the two half-structures 22, 22 is done at the plane P in which the fastening interface is located, the bolts and/or pins thereby being passed through by the plane P. In general, this plane P constitutes a plane of symmetry for the support structure of the engines 14, which, seen from the front as shown in FIG. 2, is substantially V-shaped.

Indeed, the first half-structure 22, considered to be the left in FIG. 2, is inclined relative to the direction Y going towards the top moving away from the plane P, like the second half-structure 22, considered that on the right in FIG. 2, is also inclined relative to the direction Y going towards the top moving away from the plane P. The first half-structure 22 therefore extends along a first direction 28a inclined relative to directions Y and Z in a transverse plane, while the second half-structure 22 extends along a second direction 28b also inclined relative to directions Y ad Z in the same transverse plane.

Each half-structure 22, 22 assumes the form of a beam or a box extending substantially rectilinearly in its associated direction 28a, 28b, from its inner end 24 arranged in the plane P, to its opposite end 20, 20 supporting one of the engines 10.

In the preferred embodiment, the V formed by the structure 14 opens upwards, and its tip is arranged above the longitudinal axis 2. The positioning freedom of the tip of the V as well as the freedom to set the value of the angle of the V make it possible to best adapt to the different existing stresses, and in particular makes it possible to best limit the aerodynamic disruptions encountered at the outer partitions of the half-structures 22, 22.

Indeed, the support structure is designed so that seen from the front, for each half-structure:

an acute angle (v) between a horizontal middle plane of the fuselage P', and a line 32 connecting the axis 2 of the fuselage and the longitudinal axis 12 of the engine, is greater than 25°; and an acute angle (w) between the direction 28a, 28b along which said half-structure extends, and the direction 34 normal to the fuselage at the passage of said half-structure, is smaller than 20°.

This relatively significant value of the angle (v) makes it possible to arrange the engines at the desired height relative to the fuselage, with for example the engine axes 12 situated in a horizontal plane close to an upper end of the fuselage, while the relatively small value of the angle (w), translating a spacing between the fuselage and each half-structure, makes it possible to do away with the presence of an additional aerodynamic fairing.

The design described above allows an easy assembly and disassembly of the support structure 14. Indeed, in reference to FIG. 2a diagramming a method for assembling the rear part of the aircraft 1, it can be seen that this method includes the step for placing the first half-structure 22, by movement thereof aiming to make it pass through the first fuselage opening 18 with its inner end 24 placed towards the front in the direction of movement 36a, corresponding for example to the first direction 28a in which said first half-structure extends once installed.

Figure 2A:
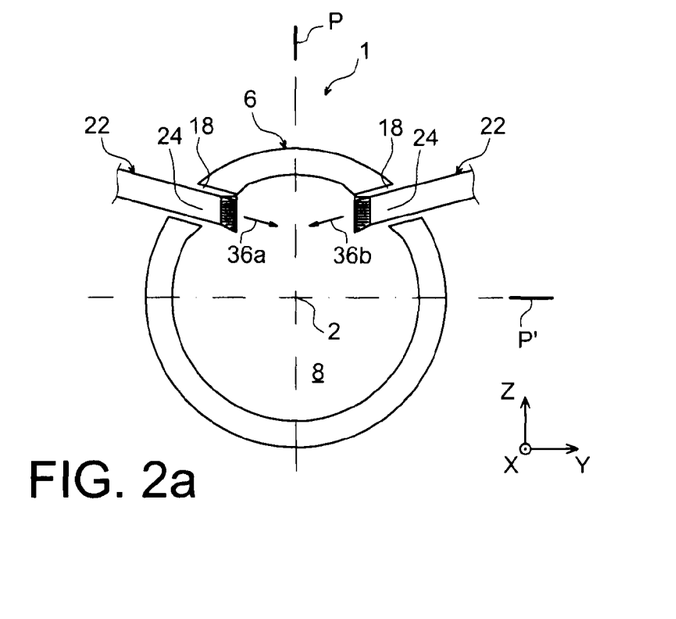
FIG. 2a diagrams the assembly method for the rear part shown in the preceding figures.

Simultaneously or successively, a step is implemented for placing the second half-structure 22, by movement thereof aiming to make it pass through the second fuselage opening 18 with its inner end 24 placed towards the front in the direction of movement 36b, corresponding for example to the second direction 28b wherein this second half-structure extends once installed.

During each of these two steps, the engine 10 can already be installed on the outer end 20 (not shown in FIG. 2a), in order to simplify and shorten the assembly method.

Moreover, it is done so that the inner ends 24, 24 are dimensioned to pass through their respective fuselage openings 18, 18, preferably even while being equipped with their reinforcing means dedicated to the assembly of the two half-structures, such as ribs or similar means. Alternatively, these reinforcing means can be mounted on the inner ends 24, 24 only after they have passed through the openings 18, 18.

In general, it is provided that in a middle opening plane, the ratio between the height of the opening and the height of a half-structure, is between 1.3 and 2. Moreover, in this same plane, the ratio between the depth of the opening and the depth of a half-structure, in direction X, is between 1.1 and 1.5.

Then, the inner end 24 of the first half-structure 22 is assembled on the inner end 24 of said second half-structure 22, using the aforementioned connecting means, which are preferably oriented along direction Y.

Fastening means are provided between the fuselage and the support structure of the engines.

Figure 3:
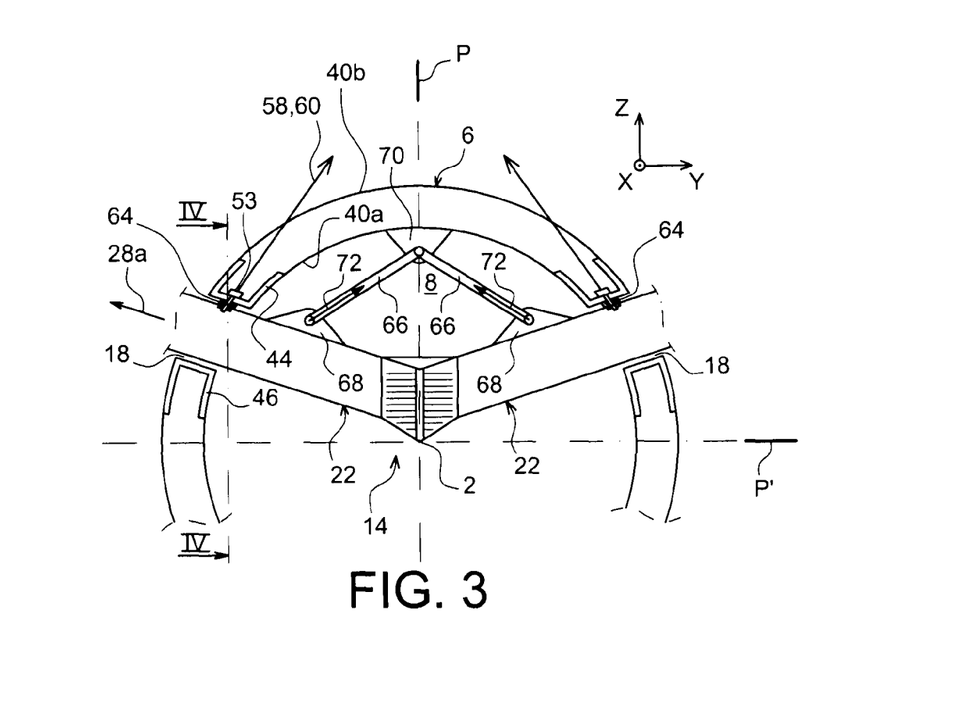
FIG. 3 illustrates a view similar to that of FIG. 2, in which first and second fastening means have been shown for fastening the support structure of the engines on the casings forming the fuselage openings, this figure also corresponding to a cross-sectional view taken along vertical line III-III of FIG. 4.
Figure 4:
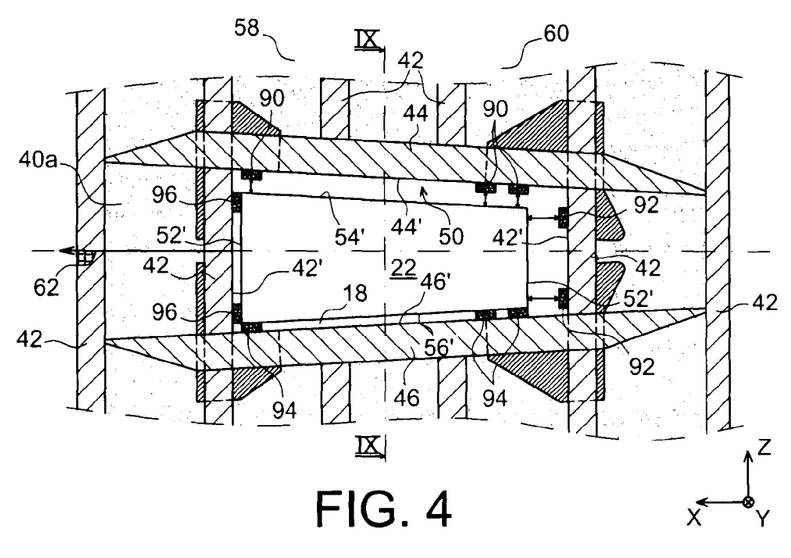
FIG. 4 shows a cross-sectional view along vertical line IV-IV of FIG. 3.

One preferred embodiment is shown in FIGS. 3 and 4.

These means first comprise first fastening means connecting the first half-structure to a first casing forming the first fuselage opening, as well as second fastening means connecting the second half-structure to a second casing forming the second fuselage opening. The first and second fastening means having a substantially identical design, and symmetrical relative to the plane P, only the first means will be described below.

First, it is noted that the first opening 18, with a design identical or similar to that of the second opening 18, is made using a passage in the inner fuselage skin 40a, and another opposite passage, in the outer fuselage skin 40b. These two passages respectively form the inlet of the opening 18, and the outlet of that same opening.

The opening is delimited towards the front by a front fuselage frame 42, and towards the back by another rear fuselage frame 42. As shown in FIG. 4, other fuselage frames 42 situated between the two aforementioned ones can be cut to reveal the opening 18. Moreover, the opening is upwardly delimited by an upper closing crosspiece 44, which preferably extends in direction X over the entire thickness of the fuselage, and which connects the two front and rear fuselage frames 42, 42. Likewise, the opening 18 is downwardly delimited by a lower closing crosspiece 46, which preferably extends in direction X over the entire thickness of the fuselage, and which connects the two front and rear fuselage frames 42, 42. The four elements 42, 42, 44, 46 together form the first casing 50 defining the opening 18.

Thus, in the vertical plane defined by line IV-IV of FIG. 3, as in the middle opening plane, which can be likened to the plane orthogonal to the half-structure 22 and passing through the opening substantially at the middle thereof between its inlet and its outlet, the casing 50 assumes the form of a quadrilateral using its four faces 42', 42', 44', 46' respectively defined by the aforementioned elements 42, 42, 44, 46. In these same planes, the four faces of the half-structure 22 also form a quadrilateral, with the faces of the half-structure and the opening being opposite two by two. As a result, the front face 52' of the half-structure is opposite the front face 42' of the casing, the rear face 52' of the half-structure is opposite the rear face 42' of the casing, the upper face 54' of the half-structure is opposite the upper face 44' of the casing, and the lower face 56' of the half-structure is opposite the lower face 46' of the casing.

The first fastening means, ensuring the assembly of the first half-structure 22 on the first casing 50, comprise at least one blocking element of the support structure, under compression loading while bearing on one hand on the first casing 50, and on the other hand of the support half-structure 22. In this configuration specific to the present invention, the first fastening means are at least partially formed using blocking elements that work in compression, and no longer in traction as was the case in the traditional elements of the prior art, of the bolt type or a similar type. This results in an ease of placement of these blocking elements, because the latter can be situated entirely in the fuselage openings 18, without having to pass through the casing 50 or the support half-structure 22.

In general, each blocking element, referenced 90, 92, is under compression loading so as to exert a force on a given face of the structure, which leads the face opposite that given face, to bear with or without contact on the face of the casing opposite it. Thus, in the illustrated embodiment, blocking elements 90, 92 are provided under compression loading in two separate directions, respectively, fitting in the middle opening plane, this being sufficient to maintain the half-structure 22 relative to the casing 50 in all directions of that middle plane of the fuselage opening.

Figure 5:
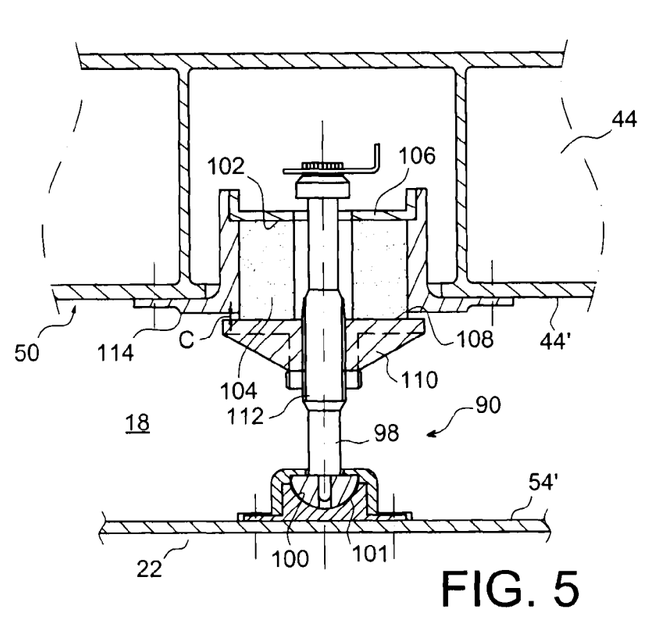
FIG. 5 shows a cross-sectional view diagramming one of the blocking elements belonging to the first fastening means shown in FIGS. 3 and 4.

More precisely, the first fastening means comprise blocking elements 90 shown diagrammatically in FIGS. 4 and 5, these elements 90 under compression loading bearing on the upper face 54' of the half-structure, and on the upper face 44' of the casing. Thus, one or several of these elements 90 arranged in rows are provided in two or more different locations of the half-structure 22, spaced in direction X. This makes it possible to ensure the recovery of the efforts in the direction orthogonal to direction 28a, in planes YZ. In other words, these blocking elements 90 make it possible to recover efforts in the middle opening plane or in a plane parallel thereto.

Similarly, the first fastening means comprise blocking element 92 shown diagrammatically in FIG. 4, these elements 92 under compression loading bearing between the rear face 52' of the half-structure, and the rear face 42' of the casing. Thus, one or several of these elements 92 arranged in rows are provided in two or several different locations of the half-structure 22, spaced along direction Z. This makes it possible to ensure the recovery of efforts in the direction orthogonal to direction 28a, in a plane XZ. In other words, these elements 92 also make it possible to recover efforts in the middle opening plane or in a plane parallel thereto, and more preferably to recover efforts in direction X.

Here, the blocking elements 90, 92 are placed on the rear face 42' and the upper face 44', in order to press the front face 52' against the front face 42' of the casing, and in order to press the lower face 56' against the lower face 46' of the casing. Alternatively, it could be possible to place the blocking elements 90, 92 other than on the rear 42' and upper 44' faces of the casing. In fact one preferably seeks to press this half-structure 22 on two attached faces of the casing, which could therefore, according to one alternative among several, be the rear 42' and upper 44' faces, by placing the blocking elements under compression loading on the front 42' and lower 46' faces.

Each blocking element 90, 92, or row of elements, is preferably provided to form a flexible fastening, using a damping member, as will be detailed below.

Moreover, secondary damping members 94, 96 are inserted between the other two attached faces 42' 46' of the support half-structure, and the casing 50. The secondary damping members make it so no direct contact exists between the support structure and the casings, even if such direct contacts could be contemplated. When such damping members and secondary damping members are not provided, a so-called rigid assembly is then obtained between the support structure and the casings.

Nevertheless, as is the case in the illustrated embodiment, each blocking element bears on said support structure and/or on its associated casing, via a damping member. This advantageously makes it possible to procure, as mentioned above, a certain flexibility for the first and second fastening means, reducing the vibrations in the fuselage. In other words, the damping members, preferably made from an elastically deformable polymer material, e.g. of the elastomer or rubber type, advantageously make it possible to damp the vibrations, and therefore participate in insulating, from a vibration perspective, the fuselage from the engine. Here again, alternatively, other damping members of the spring type can be used.

FIG. 5 shows one possible embodiment for each of the blocking elements 90, 92, incorporating such a damping element.

In this figure, it is shown that the blocking element 90 comprises a member in the form of a rod 98 oriented substantially orthogonally to the faces 44', 54' it connects. The end of this rod 98 cooperating with the face 54' of the half-structure bears in a housing 100 provided on that face. This end forming a first bearing surface 101 can be curved and have a shape complementary to that of the housing 100, for better maintenance of the bearing. On the upper face 44' of the crosspiece 44, a housing 102 is provided receiving the damping member 104, in the form of an elastomer block, for example. The bottom of the housing 102 is formed by a removable nut 106 authorizing the replacement of the elastomer block 104 without having to remove the rod 98, which passes through each of the elements 104, 106 as shown in FIG. 5.

In order to apply a compression effort in the rod, the latter has another bearing surface 108 in contact with the elastomer block 104, and more precisely with the face of that block that is opposite the face resting in the bottom of the housing 102. This bearing surface 108, opposite the first bearing surface 101, can be provided on a tightening member 110 mounted screwed on a threaded portion 112 of the rod 98. This advantageously makes it possible to constitute the means for adjusting the spacing between the two bearing surfaces 101, 108, respectively bearing on the support structure and on the casing. This functionality not only makes it possible to facilitate the placement of the blocking element 90 in the opening, but also to apply a compression pre-stress to it with a desired value, while screwing the tightening member 110.

Moreover, it is preferably done so that the damping member 104 can be compressed only over a limited crushing travel C, beyond which a rigid contact between the structure and the casing prevents the crushing from continuing. This contact is for example obtained by making the bearing surface 108 abut against the surface 114 delimiting the opening of the housing 102 receiving the elastomer block 104.

Figure 6:
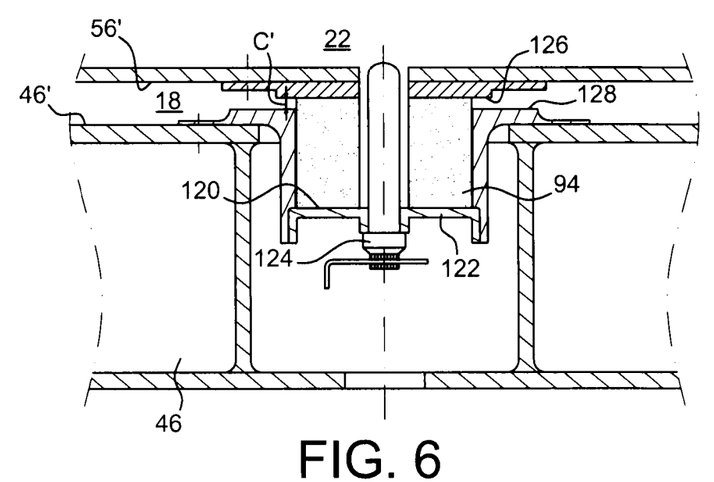
FIG. 6 shows a cross-sectional view diagramming one of the secondary damping members belonging to the first fastening means shown in FIGS. 3 and 4.

FIG. 6 illustrates one possible embodiment for each of the connections incorporating a secondary damping member 94, 96.

This figure shows that on the lower face 46' of the crosspiece 46, a housing 120 is provided receiving the secondary damping member 94, for example in the form of an elastomer block. The bottom of the housing 120 is made up of a removable nut 122 allowing easy replacement of the elastomer block 94, for example by unscrewing the nut owing to an axis 124 integral therewith.

The block 94 therefore bears in the bottom of the housing 120, as well as on a dedicated surface 126 of the face 56'. It is thereby compressed between these two bearing forces.

Moreover, it is preferably done such that the secondary damping member 94 can compress only over a limited crushing travel C', beyond which a rigid contact between the structure and the casing prevents the crushing from continuing. This contact is for example obtained by making the surface 126 abut against the surface 128 delimiting the opening of the housing 120 receiving the elastomer block 94.

As a result, it can be deduced that the first fastening means ensuring the assembly of the half-structure 22 in the casing 50 are exclusively elements under compression loading.

FIG. 3 also shows that the first and second fastening means are preferably completed by the presence of one or several effort recovery connecting rods. This globally makes it possible to minimize the intensity of the efforts passing through the opening casings 50, allowing the latter to have smaller dimensions than that previously encountered.

In the illustrated embodiment, two connecting rods 66 are provided arranged symmetrically relative to the plane P, each of these connecting rods having a first end, or lower end, shown in the support half-structure 22, and whereof the opposite end, or upper end, is mounted on the fuselage away from the openings 18.

Due to the symmetry adopted, only the left connecting rod 66 in FIG. 3, i.e. the one that completes the first fastening means, will be described.

To minimize the concentration of stresses within the support half-structure 22, at the opening 18, it is preferably done so that the first connecting rod end is also mounted on this support structure away from the openings, preferably therefore within the inner space 8. This first end is preferably mounted articulated on the half-structure 22, for example using a fitting 68 integral therewith.

It then extends while coming closer to the vertical middle plane P, in which its opposite end is mounted on the fuselage, preferably on an upper portion thereof as shown. Here again, the connection is preferably of the articulated type, using a fitting 70 or fuselage frame extension protruding towards the inner area.

The two effort recovery connecting rods, which are preferably arranged in a transverse plane and the opposite ends of which are mounted substantially at a same point of the plane P on the fuselage, together substantially form an upside-down V relative to that of the support structure 14.

Nevertheless, the position and the orientation of the connecting rods can be modified according to the needs encountered. In that respect, the connecting rods could be arranged below the structure 14, and not above it as shown.

In general, preferably each effort recovery connecting rod 66 is inclined relative to direction Z, seen along direction X like in FIG. 3. This allows it to transfer efforts along a direction whereof at least one component is oriented along direction Y, these transverse efforts in fact being the most difficult to recover with the first fastening means housed in the fuselage opening 18.

In the illustrated embodiment, each connecting rod 66 is substantially inclined relative to directions Y and Z, so as to rise as it goes towards the inside. The efforts then being exerted in these two connecting rod directions, diagrammed by the two arrows 72 of FIG. 3, can therefore be completely recovered by the fastening means. Nevertheless, one alternative solution, among others, would be to orient each connecting rod 66 along direction Y, without going beyond the scope of the invention.

Several connecting rods 66, like those shown in FIG. 3, can be provided between the support structure 14 and the fuselage 6, their number therefore not being limited to one or two. Moreover, one or several of them can each be replaced by a damping jack (not shown), capable of damping/filtering the vibrations able to be transmitted to the fuselage.

Figure 3A:
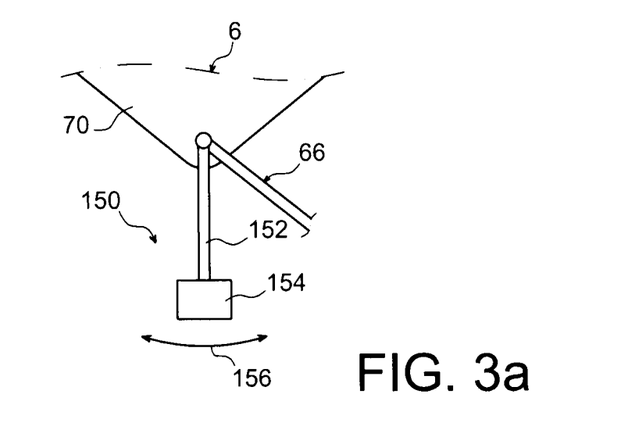
FIG. 3a shows a first alternative of the configuration shown in FIG. 3.

Still with the same aim of damping/filtering the vibrations able to be transmitted by the connecting rods 66 to the fuselage, it is possible to equip at least one of them with a resonator, an example of which is shown in FIG. 3a. In that figure, the resonator equips the end of the connecting rod that is connected to the fitting 70 of the fuselage 6. The resonator 150, extending vertically, includes a beater 152 connected to that connecting rod end by one of its ends, while its other end supports a mass 154. The damping of the vibrations transmitted to the fuselage by the connecting rod is done by an oscillating movement in the mass 154 around the hinge pin of the connecting rod on the fitting 70 of the fuselage, i.e. the hinge pin of the beater on the fitting 70, as diagrammatically shown by arrow 156 of FIG. 3a.

Figure 3B:
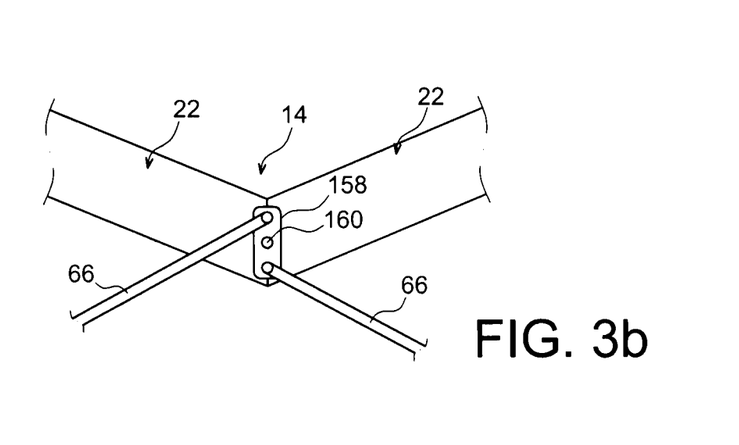
FIG. 3b shows a second alternative of the configuration shown in FIG. 3.

Moreover, as mentioned above, the arrangement of the connecting rods 66 can be adapted according to the needs and constraints encountered. In FIG. 3b, the two connecting rods 66 each have an outer end (not shown) fastened, preferably articulated, on the fuselage, preferably on the lateral portion thereof, and an inner end fastened, articulated, on a plate 158, itself articulated on the support structure 14, preferably in the middle thereof. Thus, the inner ends of the two connecting rods 66 being connected on either side of the hinge pin 160 of the plate, preferably oriented in direction X, the efforts introduced by each of the connecting rods 66 can therefore be balanced. Moreover, this addition of a plate greatly facilitates assembly, given that it eliminates the degree of hyperstatism brought by the configuration with two connecting rods. Although this is not limiting, FIG. 3b shows a configuration in which the V formed by the two connecting rods 66 is open downwardly, and globally arranged below the support structure 14.

Alternatively, the plate 158 connecting the two connecting rod ends could be articulated on the fuselage and not the support structure, for example on the fuselage fitting 70 described relative to FIG. 3.

Figure 7:
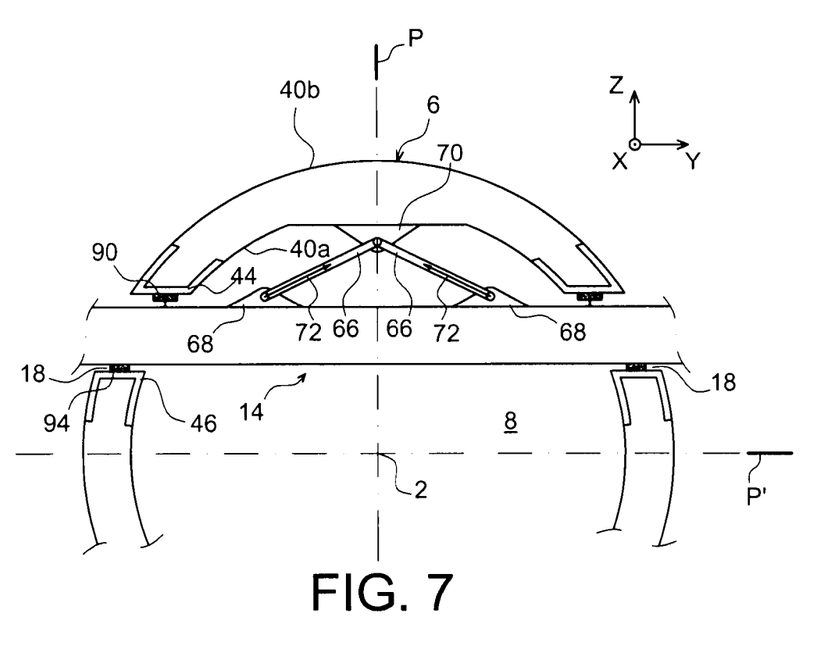
FIG. 7 shows a view similar to that of FIG. 3, in which the support structure of the engines is made according to an alternative form.

FIG. 7 shows an embodiment in which the fastening means previously described are kept, only the support structure of the engines 14 having a different design. Indeed, it is no longer made from two half-structures fastened to each other, but in a single structure, preferably rectilinear and transverse, passing through the two openings 18, 18. It is noted that this type of structure can be used regardless of the nature of the fastening means chosen.

Figure 8:
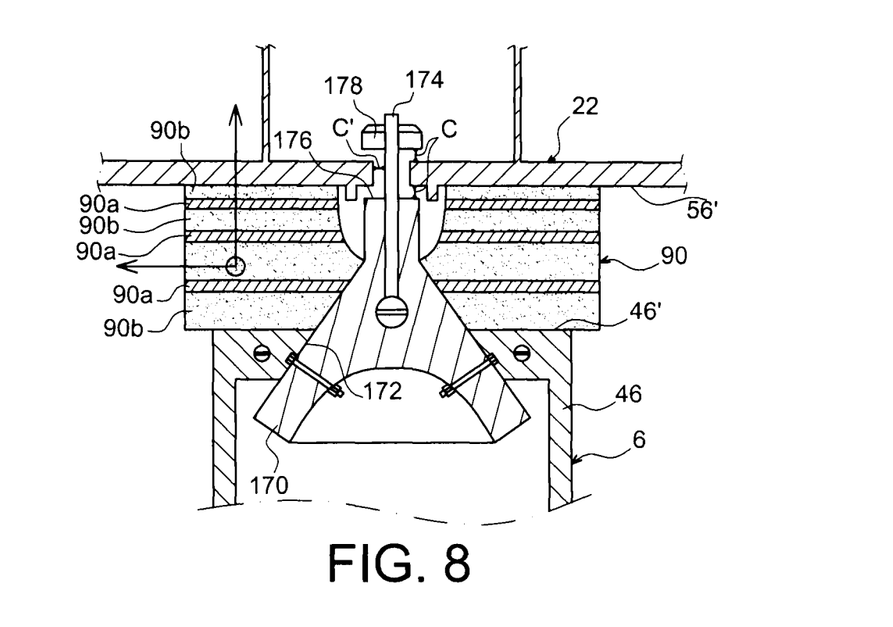
FIG. 8 shows a cross-sectional view diagramming a blocking element according to another preferred embodiment, intended to equip the first and second fastening means.

FIG. 8 shows a blocking element 90 according to another preferred embodiment, intended to equip the first and second fastening means, and in particular to be inserted between the lower face 56' of the half-structure 22, and the lower face 46' of the lower closing crosspiece 46 of the casing.

Unlike the preceding embodiment, this member 90 does not assume the form of a rod bearing against a damping member, but assumes the form of a damping block, preferably substantially parallelepiped, of the elastomer or rubber stratified block type. Thus, strips or plates 90a, preferably metal, alternate with layers 90b of elastomer or rubber, together forming a stack located between the two faces 46', 56'. Moreover, it is preferably done so that the elements of the block 90 that contact the two faces 46', 56' are layers 90b of elastomer or rubber.

The advantage of such a configuration lies in the fact that each blocking element 90 thus formed is capable of transmitting efforts in all three orthogonal directions, i.e. in the direction of the stack and in the two directions orthogonal to each other as well as to that same stack direction, corresponding to the direction of the height of the opening. This for example makes it possible to no longer require the presence of the aforementioned effort recovery connecting rods.

Still further, this particularity of effort recovery in all three directions by each blocking element 90 in the form of elastomer or rubber stratified blocks, makes it possible to limit the number of these members to form the first and second fastening means.

For example, it becomes possible to make up each of the first and second fastening means with only one or several elements 90 arranged only between the two faces 46', 56', these elements 90 in the form of stratified blocks then serving as a support for the assembly formed by the structure 14 supporting the engines 10. In this scenario, the other faces 42', 42' and 44' of the fuselage opening lack fastening elements.

Figure 9:
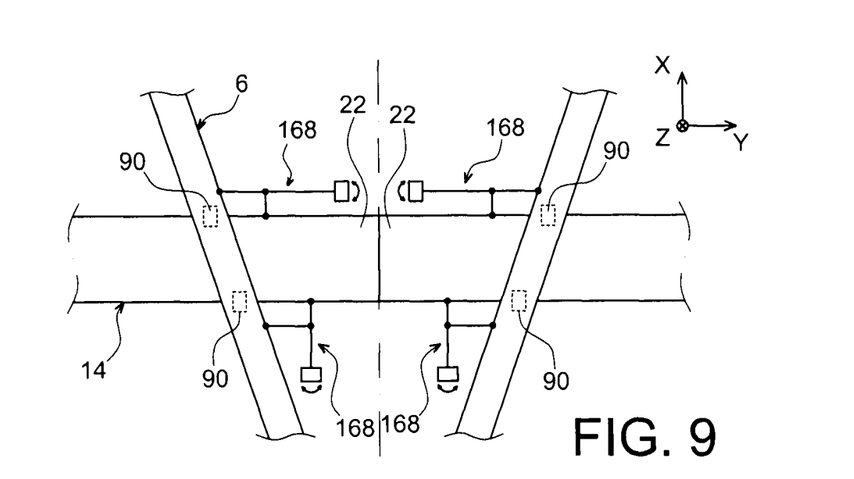
FIG. 9 shows a partial diagrammatic bottom view of the rear part of the aircraft, incorporating blocking elements of the type shown in FIG. 8.

One such example of an embodiment is shown in FIG. 9, in which only two blocking elements 90 in the form of stratified blocks are provided between each half-structure 22 and the associated fuselage opening, while being spaced apart from each other along direction X, and placed under the half-structure 22 they support. The flexibility of each element 90, in each of the three directions, can be adapted according to the needs encountered, in particular in terms of filtration/damping of vibrations. It is for example possible to provide a small flexibility in the stack direction of the block 90, and greater flexibility in the other two orthogonal directions.

Still for vibration damping/filtration purposes, resonators 168 can also be added between the structure 14 and the fuselage 6, for example equipping each of the four blocking elements 90. In FIG. 9, the two forwardmost resonators 168 are provided to filter the vibrations in direction X, while the rearmost resonators 168 are provided to filter the vibrations in direction Y.

Returning to FIG. 8, the blocking element 90 is preferably equipped with means such that it can compress in the stack direction only over a limited crushing travel, beyond which a rigid contact between the structure and the casing prevents the crushing from continuing.

To that end, a fitting 170 is provided in the shape of a triangle widening towards the bottom, fixed so that it can be disassembled on the crosspiece 46, in an orifice 172 thereof. This fitting 170 has an axis 174 extending upwards and passing, with radial play C', through the face 56' of the half-structure 22. Likewise, vertical play C is provided between the face 56' and the upper end 176 of the fitting 170 forming a stop, and another vertical play C is provided between a nut 178 mounted at the end of the axis 174, and the face opposite the face 56' of the half-structure 22.

Thus, the blocking element 90 can compress vertically only over a limited crushing travel C, beyond which a rigid contact between the structure and the casing, and more precisely between the stop 176 and the face 56', prevents the crushing from continuing. Likewise, a decompression of the blocking element 90 is possible over a travel C, beyond which the decompression is stopped by the entry into contact of the nut 178 against the opposite surface of the half-structure 22.

Such a principle is also applicable for deformations in the other two directions. Indeed, when the radial play C' is consumed, the axis 174 comes into contact with the orifice it passes through, formed in the half-structure 22.

Thus, the fitting 170, the axis 174 and the nut 178 together form a so-called "stand-by" effort recovery device, only stressed from a certain deformation level of the blocking element 90, when the play C, C' has been consumed. It is sought for this play not to be consumed during normal flight conditions, but only when strong static charges are applied, for example likely to be encountered in case of turbulence.

Lastly, it is indicated that the particular design of this stand-by device makes it easy to disassemble, by moving it from top to bottom, so as to replace the blocking element 90 if necessary, or inspect it.

Of course, various modifications can be made by those skilled in the art to the invention just described, solely as non-limiting examples. In that respect, it is noted that each feature described relative to a given embodiment can be applied to all of the other embodiments contemplated.

The invention claimed is:

1. A rear part of an aircraft comprising:
    a fuselage delimiting an inner area of the aircraft;
    at least two engines;
    a support structure for the engines, passing through the fuselage at first and second openings formed therein and distributed on either side of a vertical middle plane of the aircraft, the support structure having first and second opposite ends;
    each of the first and second opposite ends of the support structure protruding outwardly from the fuselage, on either side of the vertical middle plane, respectively, and supporting one of the engines; and
    fastening means connecting the support structure to the fuselage, comprising first fastening means connecting the support structure to a first casing forming the first fuselage opening and second fastening means connecting the support structure to a second casing forming the second fuselage opening;
    wherein the first fastening means comprises at least one blocking element of the support structure, under compression loading while bearing on the first casing, and on the support structure, and wherein the second fastening means comprises at least one blocking element of the support structure, under compression loading while bearing on the second casing, and on the support structure.

2. The rear part of an aircraft according to claim 1, wherein each of the first and second fastening means comprises at least two blocking elements of the support structure, under compression loading along two separate directions, respectively.

3. The rear part of an aircraft according to claim 1, wherein each blocking element, under compression loading, bears on the support structure and/or on its associated casing, via a damping member.

4. The rear part of an aircraft according to claim 3, wherein the damping member is made from an elastically deformable polymer material.

5. The rear part of an aircraft according to claim 1, wherein each blocking element includes means for adjusting pacing between its two bearing surfaces respectively bearing on the support structure and on the respective casing.

6. The rear part of an aircraft according to claim 1, wherein each blocking element assumes a form of a compression rod supporting two opposite bearing surfaces.

7. The rear part of an aircraft according to claim 1, wherein each of the first and second fastening means comprises blocking elements bearing on at least two faces of the support structure, and on at least one secondary damping member inserted between another face of the support structure, and the respective secondary casing.

8. The rear part of an aircraft according to claim 1, wherein the support structure and the first and second casings each have four faces substantially forming a quadrilateral in section along the associated middle opening plane, and wherein each of the first and second fastening means comprises blocking elements bearing on two attached faces of the support structure, and a secondary damping members inserted between the other two attached faces of the support structure, and the respective casing.

9. The rear part of an aircraft according to claim 1, wherein the fastening means further comprises at least one effort recovery connecting rod, whereof a first end is mounted on the support structure, and an opposite second end of which is mounted on the fuselage, spaced away from the first and second openings.

10. The rear part of an aircraft according to claim 9, wherein the effort recovery connecting rod is inclined relative to a vertical direction of the aircraft, seen along a longitudinal direction thereof.

* * * * *